US012626471B2

(12) United States Patent
Zheng et al.

(10) Patent No.: US 12,626,471 B2
(45) Date of Patent: May 12, 2026

(54) CONTROL METHOD OF VIRTUAL OBJECT, CONTROL APPARATUS, DEVICE, AND MEDIUM

(71) Applicant: Beijing Zitiao Network Technology Co., Ltd., Beijing (CN)

(72) Inventors: Haixing Zheng, Beijing (CN); Xiao Chen, Beijing (CN); Liqiang Wang, Beijing (CN); Songyun Ding, Beijing (CN); Chuanzan Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 201 days.

(21) Appl. No.: 18/460,065

(22) Filed: Sep. 1, 2023

(65) Prior Publication Data

US 2024/0078777 A1 Mar. 7, 2024

(30) Foreign Application Priority Data

Sep. 1, 2022 (CN) .......................... 202211067665.5

(51) Int. Cl.
*G06T 19/20* (2011.01)
*A63F 13/56* (2014.01)
(Continued)

(52) U.S. Cl.
CPC .............. *G06T 19/20* (2013.01); *A63F 13/56* (2014.09); *A63F 13/67* (2014.09); *G06T 7/13* (2017.01);
(Continued)

(58) Field of Classification Search
CPC ... G06T 7/13; G06T 19/20; G06T 2219/2004; G06V 10/60; G06V 10/761; A63F 13/56; A63F 13/67
See application file for complete search history.

(56) References Cited

U.S. PATENT DOCUMENTS

2019/0022521 A1 1/2019 Wang
2022/0258056 A1* 8/2022 Jiang ..................... A63F 13/426

FOREIGN PATENT DOCUMENTS

CN 109766004 A 5/2019
CN 113633995 A 11/2021
WO 2022161432 A1 8/2022

OTHER PUBLICATIONS

Petey Plays It. (May 28, 2021). 18 Cats and Dogs Gameplay Ideas to Try | The Sims 4 Guide [Video]. Youtube. http://www.youtube.com/watch?v=EgNvKzVcEmM (Year: 2021).*

(Continued)

*Primary Examiner* — Daniel F Hajnik
*Assistant Examiner* — Jed-Justin Imperial
(74) *Attorney, Agent, or Firm* — Astute IP Law Group

(57) ABSTRACT

The present disclosure relates to a control method of a virtual object, a control apparatus, a device and a medium. The method displays a target virtual scene in a target interactive interface, under the condition that there is a target virtual object in the plurality of virtual objects, displays a target control, the target virtual object being a virtual object controllable by the virtual subject in a non-contact manner; in response to receiving a trigger operation on the target control, causes the virtual subject to perform non-contact control on the target virtual object according to a control mode corresponding to the target control, wherein the target virtual scene includes a plurality of virtual objects and a virtual subject controlled by a user.

17 Claims, 7 Drawing Sheets

(51) Int. Cl.

| | |
|---|---|
| *A63F 13/67* | (2014.01) |
| *G06T 7/13* | (2017.01) |
| *G06V 10/60* | (2022.01) |
| *G06V 10/74* | (2022.01) |

(52) U.S. Cl.
CPC ............ *G06V 10/60* (2022.01); *G06V 10/761* (2022.01); *G06T 2219/2004* (2013.01)

(56) References Cited

OTHER PUBLICATIONS

"Compass-New Technology Teaching for Aerial Strikes: Tips to Increase Strike Range!", retrieved from: https://www.bilibil.com/video/BV1yE411j7qB/?vd_source=bbaa4817e15a98df801011edb, Mar. 3, 2020, 4 pages.

Hyosung Twilight, "The Most Complete Collection of Dead Christmas Attacks on the on the Web, 11 ways to prevent resurrection and Kill Directly [Elden Ring]", retrieved from: https://www.bilibili.com/video/BV1u3411n77F/?vdsource=bbaa4817e15a98df801011ed, Apr. 16, 2022, 4 pages.

Office Action for Chinese Patent Application No. 202211067665.5, mailed on Mar. 4, 2025, 29 pages.

* cited by examiner

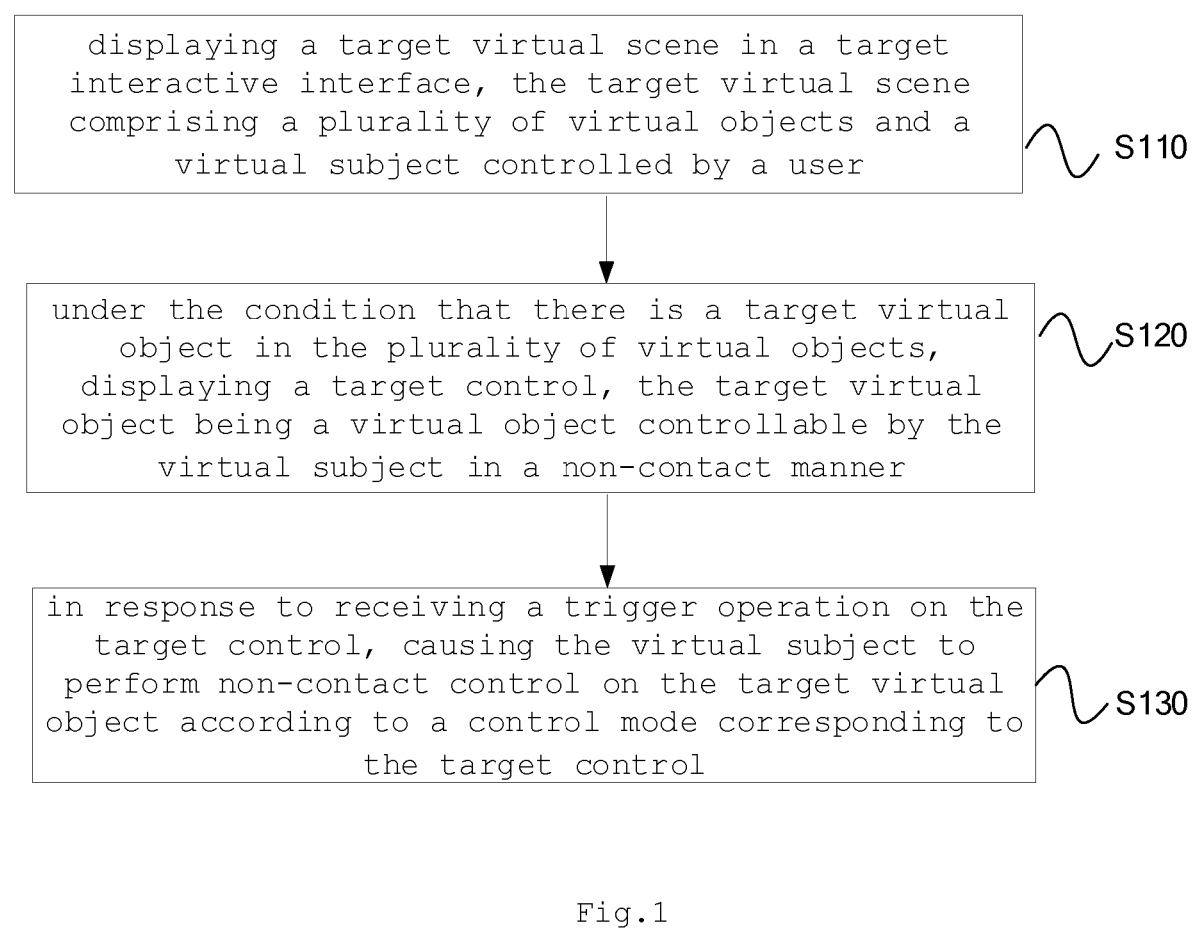

```
displaying a target virtual scene in a target
interactive interface, the target virtual scene
comprising a plurality of virtual objects and a
virtual subject controlled by a user
```
S110

```
under the condition that there is a target virtual
object in the plurality of virtual objects,
displaying a target control, the target virtual
object being a virtual object controllable by the
virtual subject in a non-contact manner
```
S120

```
in response to receiving a trigger operation on the
target control, causing the virtual subject to
perform non-contact control on the target virtual
object according to a control mode corresponding to
the target control
```
S130

Fig.1

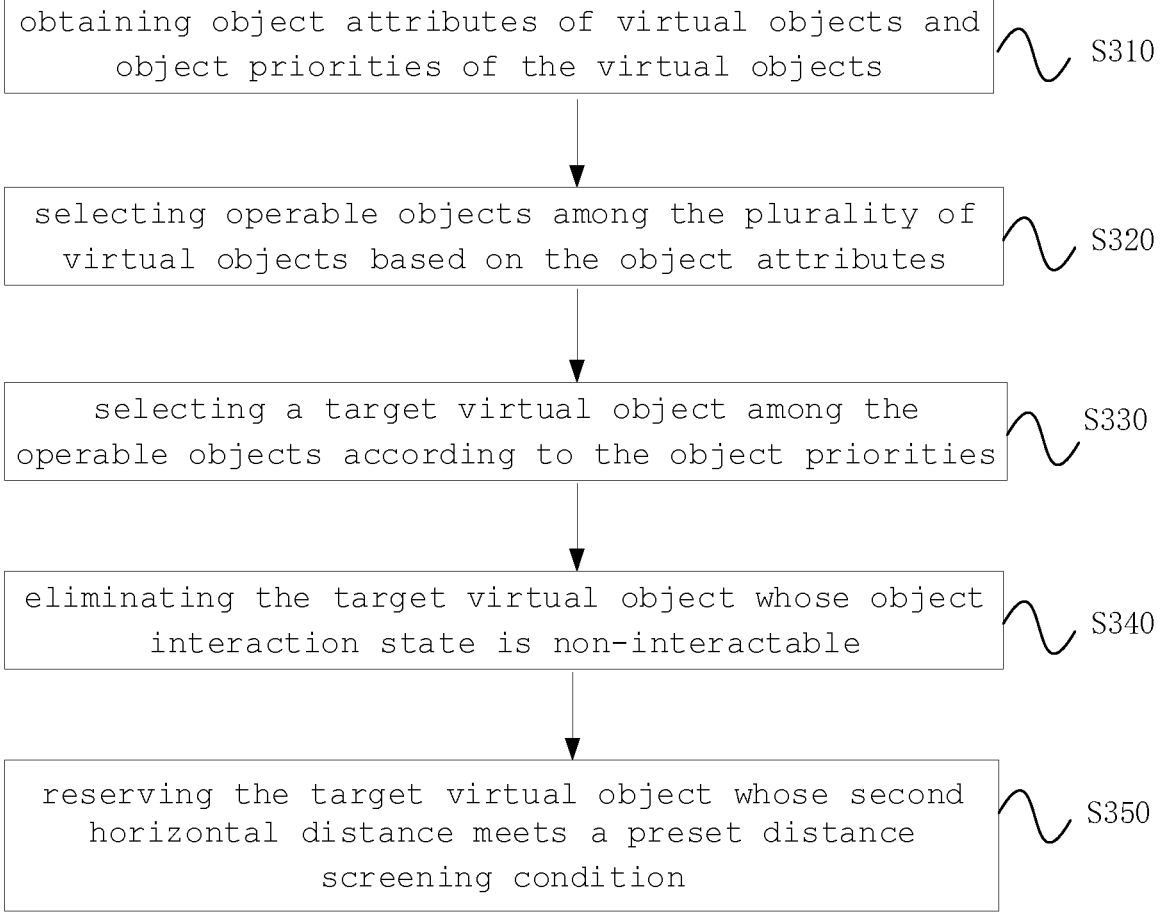

obtaining object attributes of virtual objects and object priorities of the virtual objects ∿ S310 selecting operable objects among the plurality of virtual objects based on the object attributes ∿ S320 selecting a target virtual object among the operable objects according to the object priorities ∿ S330 eliminating the target virtual object whose object interaction state is non-interactable ∿ S340 reserving the target virtual object whose second horizontal distance meets a preset distance screening condition ∿ S350

Fig.3

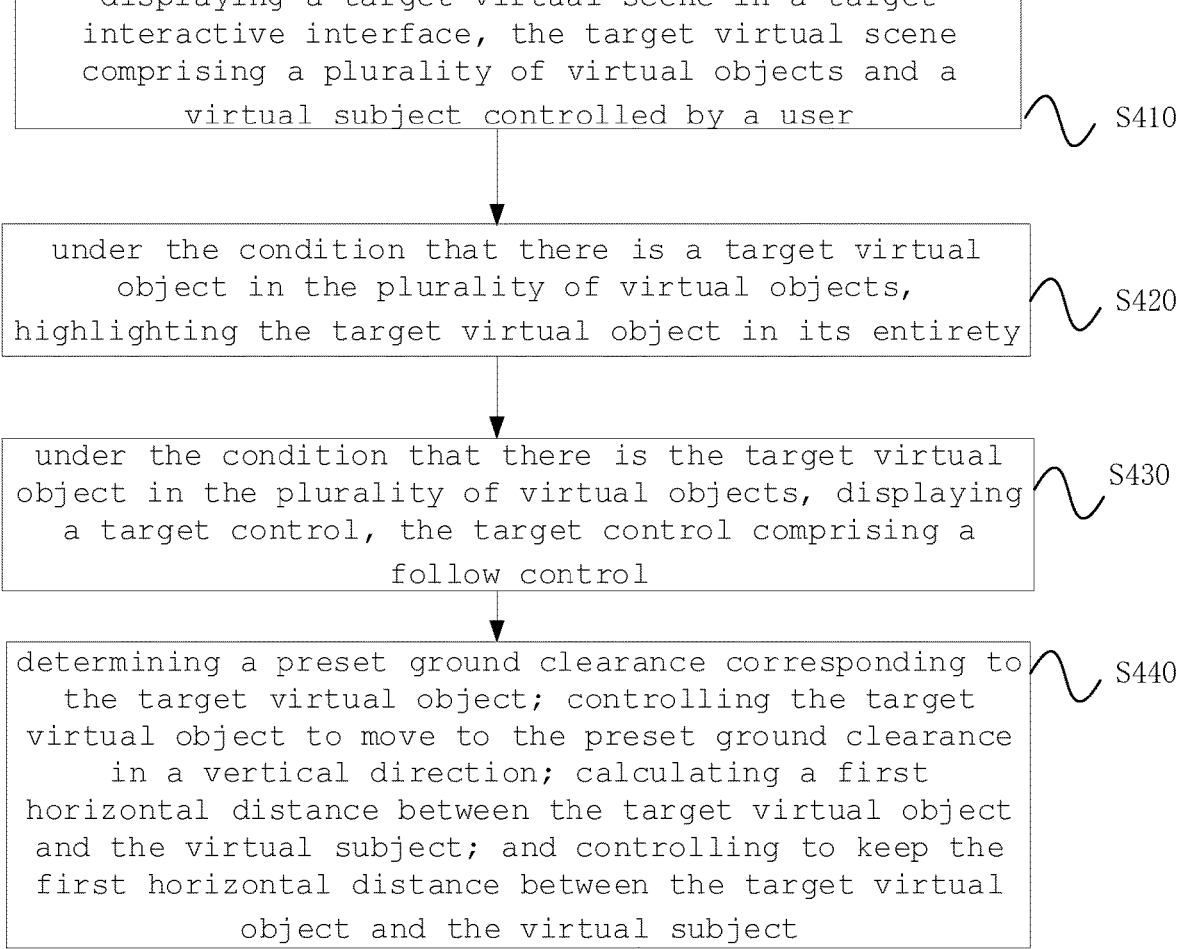

displaying a target virtual scene in a target
interactive interface, the target virtual scene
comprising a plurality of virtual objects and a
virtual subject controlled by a user

S410 under the condition that there is a target virtual
object in the plurality of virtual objects,
highlighting the target virtual object in its entirety

S420 under the condition that there is the target virtual
object in the plurality of virtual objects, displaying
a target control, the target control comprising a
follow control

S430 determining a preset ground clearance corresponding to
the target virtual object; controlling the target
virtual object to move to the preset ground clearance
in a vertical direction; calculating a first
horizontal distance between the target virtual object
and the virtual subject; and controlling to keep the
first horizontal distance between the target virtual
object and the virtual subject

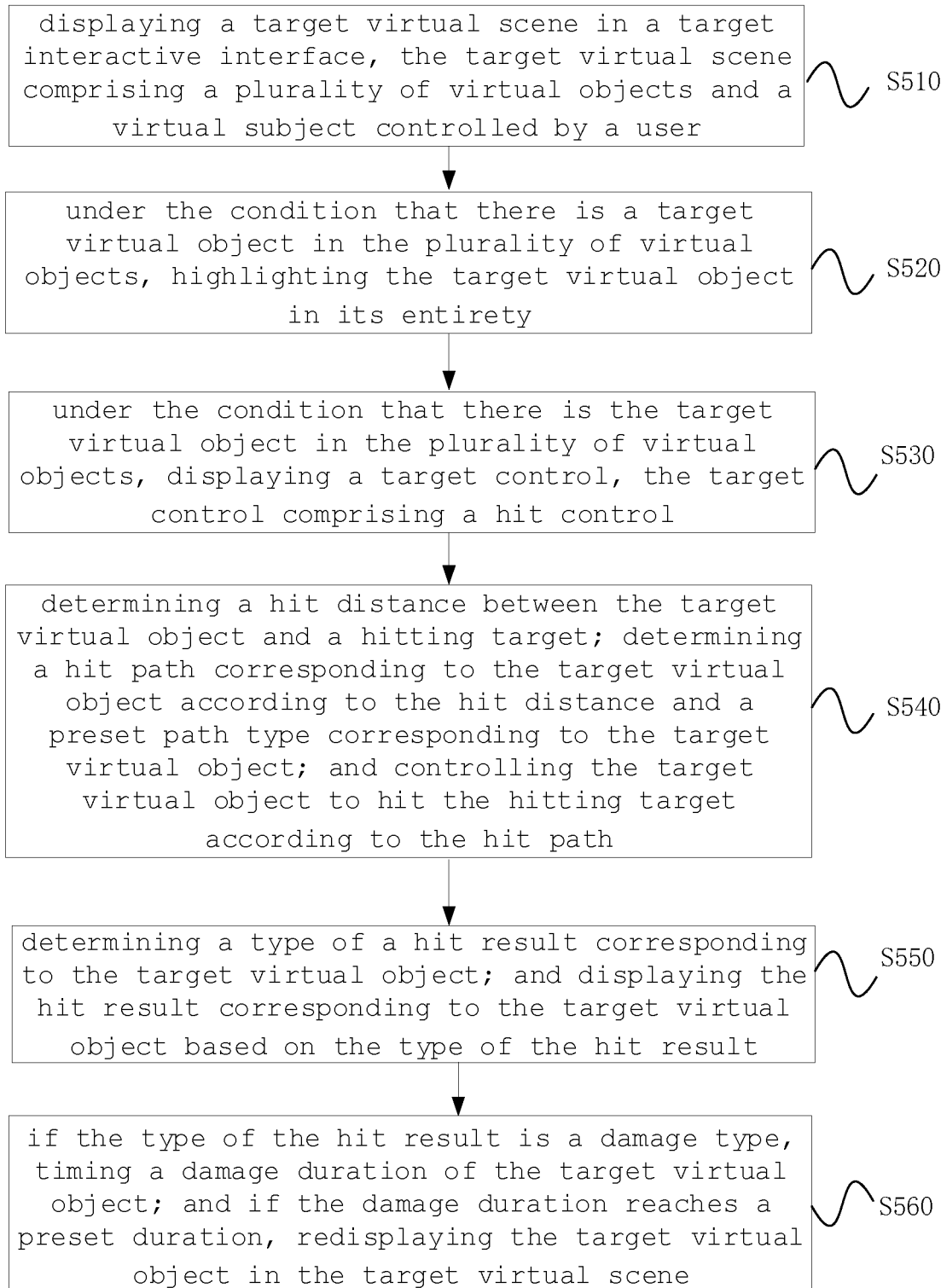

displaying a target virtual scene in a target
interactive interface, the target virtual scene
comprising a plurality of virtual objects and a
virtual subject controlled by a user
~ S510 under the condition that there is a target
virtual object in the plurality of virtual
objects, highlighting the target virtual object
in its entirety
~ S520 under the condition that there is the target
virtual object in the plurality of virtual
objects, displaying a target control, the target
control comprising a hit control
~ S530 determining a hit distance between the target
virtual object and a hitting target; determining
a hit path corresponding to the target virtual
object according to the hit distance and a
preset path type corresponding to the target
virtual object; and controlling the target
virtual object to hit the hitting target
according to the hit path
~ S540 determining a type of a hit result corresponding
to the target virtual object; and displaying the
hit result corresponding to the target virtual
object based on the type of the hit result
~ S550 if the type of the hit result is a damage type,
timing a damage duration of the target virtual
object; and if the damage duration reaches a
preset duration, redisplaying the target virtual
object in the target virtual scene
~ S560

Fig.5

CONTROL METHOD OF VIRTUAL OBJECT, CONTROL APPARATUS, DEVICE, AND MEDIUM

CROSS-REFERENCE TO RELATED APPLICATIONS

The present application is based on and claims priority of CN Application No. 202211067665.5, filed on Sep. 1, 2022, the disclosure of which is incorporated by reference herein in its entirety.

TECHNICAL FIELD

The present disclosure relates to the technical field of games, and in particular, to a control method of a virtual object, a control apparatus, a device, and a medium.

BACKGROUND

With the development of science and technology, video games running on electronic device platforms become important activities for people to enjoy leisure and entertainment. In games, players can operate characters to perform related operations in game scenes, so that the players can experience visual impact brought by the games in an immersive manner, which greatly enhances initiative and sense of reality of the games.

SUMMARY

The present disclosure provides a control method of a virtual object, a control apparatus, a device, and a medium.

In a first aspect, the present disclosure provides a control method of a virtual object, comprising:

displaying a target virtual scene in a target interactive interface, the target virtual scene comprising a plurality of virtual objects and a virtual subject controlled by a user;

under the condition that there is a target virtual object in the plurality of virtual objects, displaying a target control, the target virtual object being a virtual object controllable by the virtual subject in a non-contact manner;

in response to receiving a trigger operation on the target control, causing the virtual subject to perform non-contact control on the target virtual object according to a control mode corresponding to the target control.

In a second aspect, the present disclosure provides a control apparatus of a virtual object, comprising:

a scene display module configured to display a target virtual scene in a target interactive interface, the target virtual scene comprising a plurality of virtual objects and a virtual subject controlled by a user;

a control display module configured to, under the condition that there is a target virtual object in the plurality of virtual objects, display a target control, the target virtual object being a virtual object controllable by the virtual subject in a non-contact manner;

an object control module configured to, in response to receiving a trigger operation on the target control, cause the virtual subject to perform non-contact control on the target virtual object according to a control mode corresponding to the target control.

In a third aspect, the present disclosure provides an electronic device, comprising:

a processor;

a memory configured to store executable instructions;

wherein the processor is configured to read the executable instructions from the memory and execute the executable instructions to implement the control method of a virtual object according to the first aspect.

In a fourth aspect, the present disclosure provides a non-transitory computer readable storage medium storing a computer program which, when executed by a processor, causes the processor to implement the control method of a virtual object according to the first aspect.

BRIEF DESCRIPTION OF THE DRAWINGS

The above and other features, advantages, and aspects of the embodiments of the present disclosure will become more apparent by referring to the following DETAILED DESCRIPTION when taken in conjunction with the accompanying drawings. Throughout the drawings, the same or similar reference numbers refer to the same or similar elements. It should be understood that the drawings are schematic and that elements and components are not necessarily drawn to scale.

FIG. 1 is a schematic flowchart of a control method of a virtual object according to embodiments of the present disclosure;

FIG. 3 is a schematic flowchart of selecting a target virtual object according to embodiments of the present disclosure;

FIG. 4 is a schematic flowchart of a control method of a virtual object when a target control includes a follow control according to embodiments of the present disclosure;

FIG. 5 is a schematic flowchart of a control method of a virtual object when a target control includes a hit control according to embodiments of the present disclosure;

DETAILED DESCRIPTION

Figure 2:
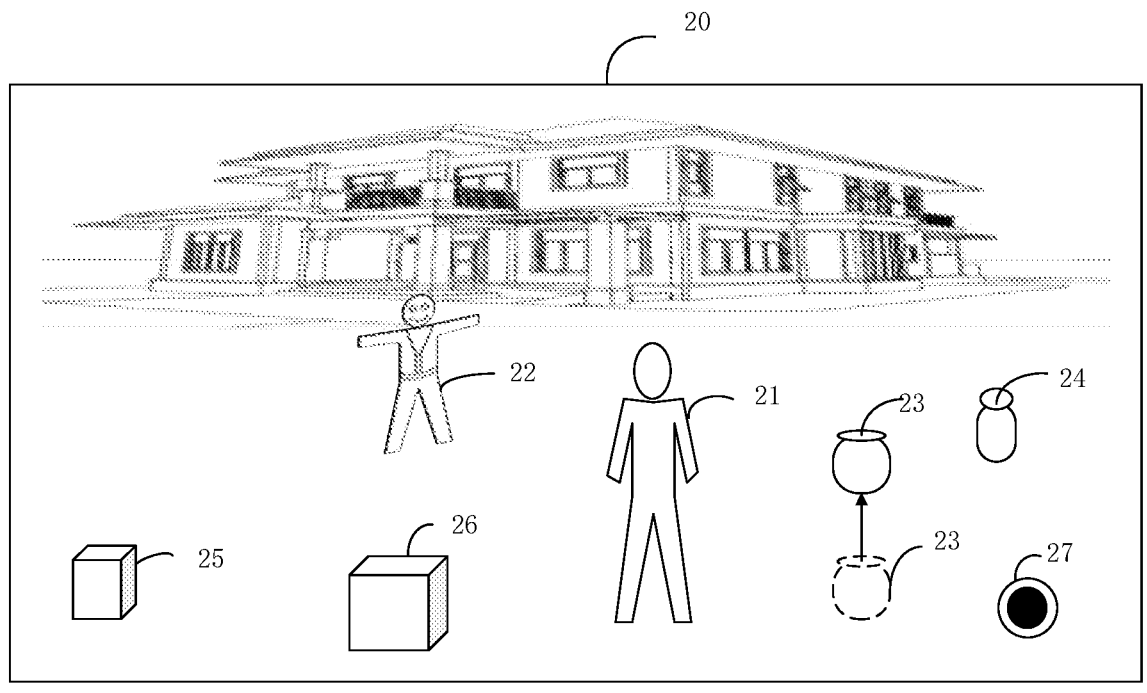
FIG. 2 is a schematic diagram of an application scenario of a control method of a virtual object according to embodiments of the present disclosure.

The embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather these embodiments are provided for a more complete and thorough understanding of the present disclosure. It should be understood that the drawings and the embodiments of the disclosure are for illustration purposes only and are not intended to limit the scope of the disclosure.

It should be understood that the various steps recited in method embodiments of the present disclosure may be performed in a different order, and/or performed in parallel. Moreover, the method embodiments may include additional steps and/or omit performing the illustrated steps. The scope of the present disclosure is not limited in this respect.

The term "comprising" and variations thereof as used herein are intended to be open-ended, i.e., "comprising but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the terms "first", "second", and the like in the present disclosure are only used for distinguishing different devices, modules or units, and are not used for limiting the order or interdependence of the functions performed by the devices, modules or units.

It is noted that references to "a", "an" or "a plurality of" in this disclosure are intended to be illustrative rather than limiting, and that those skilled in the art will appreciate that it should be understood as "one or more" unless the context clearly indicates otherwise.

With the development of science and technology, video games running on electronic device platforms become important activities for people to enjoy leisure and entertainment. In games, players can operate characters to perform related operations in game scenes, so that the players can experience visual impact brought by the games in an immersive manner, which greatly enhances initiative and sense of reality of the games.

However, in the related art, when the players operate characters to control objects in the game scenes, for lack of sense of science and technology and sense of fantasy, funs of the players are reduced.

In order to solve the above problem, the embodiments of the present disclosure provide a control method of a virtual object, a control apparatus, a device, and a medium. The control method of a virtual object is described first below in conjunction with specific embodiments.

Compared with the related art, the technical solutions provided by the embodiments of the present disclosure have the following advantages:

The control method of a virtual object, the apparatus, device, and the medium according to the embodiments of the present disclosure can automatically identify the target virtual object controllable by the virtual subject in a non-contact manner, in the target virtual scene displayed in the target interactive interface, and display the target control to prompt a user to control the target virtual object, then after receiving a trigger operation on the target control, in response to the trigger operation, cause the virtual subject to control the target virtual object in a non-contact manner according to the control mode corresponding to the target control, so that the player can operate the automatically selected virtual object from a distance, thereby increasing sense of science and technology and sense of fantasy to the game, and increasing funs to the player.

FIG. 1 is a schematic flowchart of a control method of a virtual object according to an embodiment of the present disclosure.

In the embodiment of the present disclosure, the control method of a virtual object may be executed by an electronic device. The electronic device may include, but is not limited to, a mobile terminal such as a VR (virtual reality), mobile phone, notebook computer, digital broadcast receiver, PDA (personal digital assistant), PAD (tablet computer), PMP (portable multimedia player), in-vehicle terminal (e.g., in-vehicle navigation terminal), wearable device, and a fixed terminal such as a digital TV, desktop computer, smart home device.

As shown in FIG. 1, the control method of a virtual object mainly comprises the following steps:

S110, displaying a target virtual scene in a target interactive interface, the target virtual scene comprising a plurality of virtual objects and a virtual subject controlled by a user.

In the embodiment of the disclosure, the target interactive interface is an interface which is presented through a screen of an electronic device and is being controlled by a user.

Generally, a video game installed on an electronic device will create a virtual environment, and create various virtual scenes according to the virtual environment, and at the same time set a virtual subject representative of a user, i.e., a player, and the player controls the virtual subject to realize interaction between the player and virtual objects in the virtual environment, so that the player is immersed in the scene and the sense of reality of the player is improved.

Furthermore, in the embodiment of the present disclosure, the target interactive interface will display a target virtual scene, and the target virtual scene will include the virtual objects and the virtual subject.

The virtual object may be an object displayed in the virtual scene except the virtual subject. The virtual object may be one or more.

S120, under the condition that there is a target virtual object in the plurality of virtual objects, displaying a target control, the target virtual object being a virtual object controllable by the virtual subject in a non-contact manner;

In the embodiment of the present disclosure, the electronic device searches in the plurality of virtual objects and determines whether there is a target virtual object in the plurality of virtual objects, for example, according to a parameter such as a distance between the virtual object and the virtual subject.

Under the condition that it is determined that there is a target virtual object in the plurality of virtual objects, the target virtual object is selected. Simultaneously, a target control is displayed on a screen of the electronic device. The player can operate (e.g., click) the target control and trigger a control mode corresponding to the target control.

The number of the target virtual objects can be one or more. When there are more than one target virtual object, the virtual subject can simultaneously control the more than one target virtual object in a non-contact manner.

The number of the target controls can be one or more. The same one target control can have different triggering modes, such as single-click, double-click, long-press, and different triggering modes correspond to different control modes.

S130, in response to receiving a trigger operation on the target control, causing the virtual subject to perform non-contact control on the target virtual object according to a control mode corresponding to the target control.

In the embodiments of the present disclosure, the control mode may be a mode to control behaviors, actions, and the like of the target virtual object.

Specifically, the electronic device receives an operation of a player on the target control, triggers a control mode corresponding to the target control, and controls behaviors, actions and the like of the target virtual object, so as to control the target virtual object under the condition that the virtual subject does not contact the target virtual object, to reach the effect of non-contact control on the target virtual object by the virtual subject.

FIG. 2 is a schematic diagram of an application scenario of a control method of a virtual object according to an embodiment of the present disclosure, and the control method of a virtual object shown in FIG. 1 is further described with reference to the application scenario shown in FIG. 2.

As shown in FIG. 2, the screen of the electronic device displays a target virtual scene 20, which includes a virtual subject 21 representative of a player, and a virtual object 22 in an opposite relation with the virtual subject 21, and the target virtual scene 20 includes a plurality of virtual objects, which are virtual objects 23, 24, 25 and 26, respectively.

The electronic device searches in the target virtual scene 20 and obtains a plurality of virtual objects, namely the virtual objects 23, 24, 25 and 26. The electronic device determines that the target virtual object is the virtual object 23 according to parameters such as a distance between the virtual object and the virtual subject and so on.

Further, the electronic device controls a target control 27 to be displayed on the screen of the electronic device. For example, the control mode corresponding to the target control 27 is to cause the target virtual object to vertically rise by a preset height. When the player operates the target control 27, the electronic device controls the virtual object 23 to vertically rise by a preset height according to the control mode corresponding to the target control 27, in response to a trigger operation of the player on the target control 27.

Next, the control method of a virtual object according to the embodiment of the present disclosure is described again by taking the electronic device in FIG. 2 as a VR device.

In a VR application scenario, the target virtual scene is displayed on a screen of a VR device, and when the target virtual scene includes a target virtual object, a target control is displayed on the screen of the VR device, for example, the target control is to cause the target virtual object to vertically rise by a preset height. The player operates a handle connected with the VR device to realize the trigger operation on the target control. The VR device receives the trigger operation and causes the target virtual object to vertically rise by a preset height.

Therefore, the embodiments of the disclosure can automatically identify the target virtual object controllable by the virtual subject in a non-contact manner, in the target virtual scene displayed in the target interactive interface, and display the target control to prompt a user to control the target virtual object, then after receiving a trigger operation on the target control, in response to the trigger operation, cause the virtual subject to control the target virtual object in a non-contact manner according to the control mode corresponding to the target control, so that the player can operate the automatically selected virtual object from a distance, thereby increasing sense of science and technology and sense of fantasy to the game, and increasing funs to the player.

In some embodiments, the electronic device may select the target virtual object specifically by: acquiring object parameters of various virtual objects, wherein the object parameters comprise object attributes and object priorities; selecting operable objects within the plurality of virtual objects based on the object properties; and selecting a target virtual object among the operable objects based on the object priorities.

The object attributes of the virtual object may be a state of the virtual object, a camp of the virtual object, a distance of the virtual object, and the like.

For example, the state of the virtual object may be a static state, a moving state, or the like, and a virtual object in the static state is selected as the operable object.

The camp of the virtual object can be enemy camp, our camp, neutral camp and the like, and a virtual object in our camp or neutral camp is selected as the operable object.

The distance of the virtual object can be a distance between the virtual object and the virtual subject, a distance between the virtual object and a hitting target, and the like, and a virtual object with a distance from the virtual subject within a certain preset range is selected as the operable object.

After the electronic device selects the operable objects according to the above attributes, further according to priorities of the operable objects, an operable object with the highest priority is selected as the target virtual object.

Specifically, the virtual objects may be classified into different types in advance, and a priority of each type may be preset. Further, after the operable objects are determined, the types of the operable objects are determined first, and then according to the preset priority of each type, the operable object with the highest priority is selected as the target virtual object.

Illustratively, by taking a hitting game as an example, the virtual objects may be divided into: an automatic class, a manual trap class, etc. The automatic class may be of a type that includes a throwable virtual object, for example of a type that includes virtual objects such as a stone, a barrel. The manual trap class may be a virtual object whose actual motion trajectory can directly hit a target, and the manual trap for example may be of a type that includes virtual objects such as a ceiling lamp, a clock and so on.

Illustratively, the priority of the manual trap class is set to be Level 1, the priority of the automatic class is set to be Level 2, and the priority Level 1 is set to be higher than the priority Level 2.

Further, when the plurality of virtual objects include a virtual object of the manual trap class, the virtual object of the manual trap class is selected as the target virtual object.

In other embodiments, the object parameters further include object importance.

Further, the selecting a target virtual object among the operable objects based on the object priorities may be: selecting a target virtual object among the operable objects with the highest object priority, according to the object importance.

Specifically, after the selecting the operable objects with the highest priority based on the priorities of the virtual objects, the target virtual object is further selected according to the object importance.

Illustratively, when the plurality of virtual objects include virtual objects of the manual trap class, among the virtual objects of the manual trap class, for example, the importance of the ceiling lamp is set to be higher than that of the clock, and thus the electronic device selects the ceiling lamp as the target virtual object according to the importance of the virtual object.

In other embodiments, the object parameters may also include an object interaction state.

Further, after the selecting a target virtual object among the operable objects, the method further comprises: eliminating the target virtual object whose object interaction state is non-interactable.

Specifically, the object interaction state may be whether a virtual object is in a state of interacting with other virtual objects. When a virtual object is interacting with another virtual object, the virtual subject can no longer interact with the virtual object, and therefore, it is needed to eliminate a target virtual object that has been interacting with another virtual object.

In other embodiments, the object parameters further include a second horizontal distance from a center of the target interactive interface.

Further, after the selecting a target virtual object among the operable objects based on the object priorities, the method further comprises: reserving the target virtual object whose second horizontal distance meets a preset distance screening condition.

In some embodiments, the reserving the target virtual object whose second horizontal distance meets a preset distance screening condition may be: by taking a center point of the target interactive interface as the center of the target interactive interface, dividing the target interactive interface into a plurality of areas, and after the electronic device determines the target virtual object according to the priorities of the virtual objects, screening out the target virtual object in a fixed area whose distance from the center point of the target interactive interface is within a preset distance.

Illustratively, by taking the center point of the target interactive interface as the center of the target interactive interface, the target interactive interface is divided into a plurality of rectangular areas, for example, the target interactive page is divided into 6 rectangular areas, and a target virtual object in one third of the areas, i.e., 2 rectangular areas in the middle, whose distance from the center point of the target interactive interface is within a preset distance is screened out.

It can be understood that, if a target virtual object whose distance from the center point of the target interactive interface is within a preset distance is not screened out in the 2 rectangular areas in the middle, it is also possible to further screen the target virtual object beyond the preset distance in other areas.

In other embodiments, the reserving the target virtual object whose second horizontal distance meets a preset distance screening condition may also be: by taking the virtual subject as a center, dividing the target interactive interface into a plurality of areas, and after the electronic device determines the target virtual object according to the priorities of the virtual objects, screening out the target virtual object in a fixed area whose distance from the virtual subject in the target interactive interface is within a preset distance.

Illustratively, when the virtual subject is taken as the center, the target interactive interface is divided into a plurality of sectorial areas, for example, the target interactive interface is divided into 6 sectorial areas, and after the electronic device determines the target virtual object according to the priorities of the virtual objects, a target virtual object in one third of the areas in the middle, i.e., 2 sectorial areas in the middle, whose distance from the virtual subject in the target interactive interface is within a preset distance is screened out.

It can be understood that, if a target virtual object whose distance from the virtual subject in the target interactive interface is within a preset distance is not screened out in the 2 sectorial areas in the middle, it is also possible to further screen the target virtual object beyond the preset distance in other areas.

The above process of selecting a target virtual object is described below in a specific embodiment. As shown in FIG. 3, selecting a target virtual object comprises the following steps:

S310, obtaining object attributes of virtual objects and object priorities of the virtual objects.

S320, selecting operable objects among the plurality of virtual objects based on the object attributes.

S330, selecting a target virtual object among the operable objects according to the object priorities.

S340, eliminating the target virtual object whose object interaction state is non-interactable.

S350, reserving the target virtual object whose second horizontal distance meets a preset distance screening condition.

In the embodiments of the present disclosure, the technical solutions of the steps S310 to S350 refer to the above description, and are not repeated herein.

According to the embodiments of the present disclosure, after the target virtual object is determined according to the object attributes and the object priorities, the target virtual object whose interaction state is non-interactable is further eliminated, and the target virtual object whose second horizontal distance meeting a preset distance screening condition is reserved. It can be seen that, in the embodiments of the present disclosure, the target virtual object is determined through multiple parameter judgements to select an optimal target virtual object for the player, which improves the experience of the player.

In some embodiments, before the electronic device automatically selects the target virtual object, the number of virtual objects that can be controlled by the virtual subject may be determined first, and then the target virtual object may be selected according to the number of virtual objects that can be controlled by the virtual subject.

The determining the number of virtual objects that can be controlled by the virtual subject may be: obtaining a subject attribute of the virtual subject, wherein the subject attribute comprise at least one of a subject level or a target skill rank; and determining a maximum number of objects that can be controlled by the virtual subject in a non-contact manner according to the subject attribute.

Since in a video game, different players have different levels, virtual subjects representative of the players have different levels, and the virtual subjects of different levels also have different skills.

Therefore, in some embodiments, a maximum number of virtual objects that can be controlled by different levels of virtual subjects may be preset in a video game. Thus, the electronic device may determine, according to the above setting information, a maximum number of virtual objects that can be controlled by the virtual subject in the target virtual scene.

In some embodiments, under the condition that there is a target virtual object in the plurality of virtual objects, that is, after the target virtual object is determined, in order to enable the player to see the target virtual object more clearly, it is necessary to distinguish the target virtual object from non-target virtual objects among the plurality of virtual objects.

Alternatively, the distinguishing the target virtual object from non-target virtual objects among the plurality of virtual objects may be: under the condition that there is the target virtual object in the plurality of virtual objects, highlighting the target virtual object in its entirety.

In some embodiments, the target virtual object may always be highlighted in its entirety, and in other embodiments, the brightness of the target virtual object may also be adjusted.

Specifically, in some embodiments, a brightness value of the target virtual object may be reduced in real time according to a preset brightness difference; and under the condition that the brightness value of the target virtual object is reduced to a preset brightness value, an edge of the target virtual object is highlighted.

Specifically, a brightness reduction value of the target virtual object in a unit time (for example, 1 second) is preset. According to the preset brightness reduction value of the target virtual object in the unit time, the brightness value of the target virtual object which is highlighted in its entirety is reduced in the unit time, and the edge of the target virtual object is highlighted under the condition that the brightness value of the target virtual object is reduced to the preset brightness value.

In other embodiments, the brightness value of the target virtual object may also be reduced in real time according to the preset brightness difference, and the displaying the target control may be cancelled under the condition that the brightness value of the target virtual object is reduced to the preset brightness value.

Specifically, the player may not want to control the target virtual object, and therefore, when the brightness value of the target virtual object is reduced to the preset brightness value, the target virtual object is not highlighted in its entirety, and the electronic device does not display the target control.

In some embodiments, the target control may be a follow control.

specifically, the follow control may be a control that causes the target virtual object to follow the virtual subject.

When the target control is a follow control, the causing the virtual subject to perform non-contact control on the target virtual object according to a control mode corresponding to the target control in the step S130 may be: controlling the target virtual object to follow the virtual subject, so as to reach an effect that the virtual subject controls the target virtual object to follow the virtual subject itself in a non-contact control mode.

The controlling the target virtual object to follow the virtual object may be: determining a preset ground clearance corresponding to the target virtual object; controlling the target virtual object to move to the preset ground clearance in a vertical direction; calculating a first horizontal distance between the target virtual object and the virtual subject; and controlling to keep the first horizontal distance between the control target virtual object and the virtual subject.

In the embodiment of the present disclosure, in order to enable the player to have a more real control experience, the electronic device may control the target virtual object to move to the preset ground clearance in the vertical direction, and by classifying the plurality of virtual objects into different types, different ground clearances may be set for the virtual objects of different types. Thereafter, the horizontal distance between the target virtual object and the virtual subject is calculated, and then the target virtual object is controlled to move following the virtual subject in the horizontal direction according to the calculated horizontal distance, on the preset ground clearance.

FIG. 4 is a schematic flowchart of a control method of a virtual object when a target control includes a follow control according to an exemplary embodiment of the present disclosure. As shown in FIG. 4, the control method of a virtual object comprises the following steps:

S410, displaying a target virtual scene in a target interactive interface, the target virtual scene comprising a plurality of virtual objects and a virtual subject controlled by a user.

In the embodiments of the present disclosure, the step is identical with the step S110, and is not described herein again.

S420, under the condition that there is a target virtual object in the plurality of virtual objects, highlighting the target virtual object in its entirety.

S430, under the condition that there is the target virtual object in the plurality of virtual objects, displaying a target control, the target control comprising a follow control.

S440, determining a preset ground clearance corresponding to the target virtual object; controlling the target virtual object to move to the preset ground clearance in a vertical direction; calculating a first horizontal distance between the target virtual object and the virtual subject; and controlling to keep the first horizontal distance between the target virtual object and the virtual subject.

In the embodiments of the present disclosure, for the steps S420 to S440, specific technical solutions refer to the related contents described above, and are not described herein again.

By taking the electronic device as a VR device, the control method of a virtual object when a target control includes a follow control according to the embodiment of the present disclosure is described below.

In a VR application scenario, a target virtual scene is displayed on a screen of the VR device, and when the target virtual scene comprises a target virtual object, the target virtual object is highlighted on the screen of the VR device, and a follow control is displayed. After the player triggers the control, the VR device controls the target virtual object to move to a preset ground clearance in a vertical direction and calculates a horizontal distance between the target virtual object and the virtual subject, so that the target virtual object follows the virtual subject at the preset ground clearance and at a first horizontal distance from the virtual subject.

Therefore, according to the embodiment of the disclosure, when there is a target virtual object in the plurality of virtual objects, the target virtual object is highlighted in its entirety, so that the target virtual object and non-target virtual objects can be clearly distinguished, which improves the experience of the player; meanwhile, when the target control is a follow control, the target virtual object is controlled to follow the virtual subject, which achieves the effect of controlling the target virtual object in a non-contact manner by the virtual subject, increasing the sense of science and technology and the sense of fantasy to the game, and increasing funs to the player.

In other embodiments, the target control may also be a hit control.

Specifically, the hit control may be a control that controls the target virtual object to hit other virtual objects included in the target virtual scene, except for the virtual subject and the target virtual object.

When the target control is a hit control, the causing the virtual subject to perform non-contact control on the target virtual object according to a control mode corresponding to the target control in the step S130 may be: determining a hit distance between the target virtual object and a hitting target; determining a hit path corresponding to the target virtual object according to the hit distance and a preset path type corresponding to the target virtual object; and controlling the target virtual object to hit the hitting target according to the hit path.

Specifically, in the embodiment of the present disclosure, the electronic device first needs to determine the hitting target of the target virtual object.

Preferably, the hitting target is a virtual object to be hit by the virtual subject in the target virtual scene. For example, the hitting target is the virtual object 22 in an opposite relation with the virtual subject 21 shown in FIG. 2.

After the hitting target is determined, further, at least one of a horizontal distance or vertical distance between the target virtual object and the hitting target is determined.

Further, the electronic device, according to a preset path type corresponding to the target virtual object and the above at least one of the horizontal distance or vertical distance, selects a hit path from the preset path type.

The path type may be a straight path type, a parabolic path type, or the like, which is not limited in the embodiments of the present disclosure.

Thus, the preset path type corresponding to the target virtual object may be that the plurality of virtual objects are classified into different types, and different path types are set for the different types of the virtual objects.

Further, the electronic device controls the target virtual object to hit the target along the hit path.

In still other embodiments, the target control may further include a scroll control, a rotation control, and the like, which is not described herein again in the embodiments of the present disclosure, and the control modes corresponding to the controls are also not described herein again.

In the case that the target control is a hit control, in some embodiments, after the target virtual object hits the target object, the target virtual object may be damaged or reduced in energy or kept in an existing state unchanged, or the like.

Therefore, in some embodiments, types of hit results corresponding to different target virtual objects may be set, and the hit results corresponding to the target virtual objects may be displayed based on the types of the hit results.

Specifically, the type of the hit result may be a type corresponding to a result of the target virtual object after the target virtual object hits the target.

Illustratively, the type of the hit result is a damage type, a state change type, or the like.

The hit result may be a result of the target virtual object after the target virtual object hits the target.

Illustratively, the hit results are the target virtual object being damaged, the target virtual object being reduced in energy, the target virtual object being kept in a state unchanged, described above, or the like.

In some embodiments, if the type of the hit result is a damage type, the target virtual object may be regenerated, i.e., redisplaying the target virtual object in the target virtual scene.

Alternatively, the redisplaying the target virtual object in the target virtual scene may be: timing a damage duration of the target virtual object; and if the damage duration reaches a preset duration, redisplaying the target virtual object in the target virtual scene.

Specifically, after the target virtual object is damaged, timing is performed, and after the damage duration reaches the preset duration, the target virtual object is redisplayed in the target virtual scene at a position before the target virtual object is damaged, or at a position damaged when the target virtual object hits the target, or at other preset positions, or the like.

FIG. 5 is a schematic flowchart of a control method of a virtual object when a target control includes a hit control according to an embodiment of the present disclosure. As shown in FIG. 5, the control method of a virtual object comprises the following steps:

S510, displaying a target virtual scene in a target interactive interface, the target virtual scene comprising a plurality of virtual objects and a virtual subject controlled by a user.

In the embodiments of the present disclosure, the step is identical with the step S110, and is not described herein again.

S520, under the condition that there is a target virtual object in the plurality of virtual objects, highlighting the target virtual object in its entirety.

S530, under the condition that there is the target virtual object in the plurality of virtual objects, displaying a target control, the target control comprising a hit control.

S540, determining a hit distance between the target virtual object and a hitting target; determining a hit path corresponding to the target virtual object according to the hit distance and a preset path type corresponding to the target virtual object; and controlling the target virtual object to hit the hitting target according to the hit path.

S550, determining a type of a hit result corresponding to the target virtual object; and displaying the hit result corresponding to the target virtual object based on the type of the hit result.

S560, if the type of the hit result is a damage type, timing a damage duration of the target virtual object; and if the damage duration reaches a preset duration, redisplaying the target virtual object in the target virtual scene.

In the embodiments of the present disclosure, for the steps S520 to S560, specific technical solutions refer to the related contents described above, and are not described herein again.

By taking the electronic device as a VR device, a control method of a virtual object when a target control includes a hit control according to an embodiment of the present disclosure is described below.

In a VR application scenario, a target virtual scene is displayed on a screen of the VR device, and when the target virtual scene comprises a target virtual object, the target virtual object is highlighted on the screen of the VR device, and a hit control is displayed. After the player triggers the control, the VR device determines a hit path and hits the target according to the hit path.

Furthermore, the VR device judges a type of a hit result, and when the type of the hit result is a damage type, a damage duration of the target virtual object is timed, and when the damage duration reaches a preset duration, the target virtual object is redisplayed in the target virtual scene.

Therefore, according to the embodiments of the disclosure, when there is a target virtual object in the plurality of virtual objects, the target virtual object is highlighted in its entirety, so that the target virtual object and non-target virtual objects can be clearly distinguished, and the experience of a player is improved; meanwhile, when the target control is a hit control, the target virtual object is controlled to hit the target according to a hit path, which achieves the effect of controlling the target virtual object in a non-contact manner by the virtual object; meanwhile, when the hit result corresponding to the target virtual object is of a damage type, when the damage duration reaches the preset duration, the target virtual object is redisplayed in the target virtual scene, which not only maintains integrity of the target virtual scene, but also causes the target virtual object to be used infinitely, thereby further increasing the sense of science and technology and the sense of fantasy to the game, and increasing funs to the player.

Figure 6:
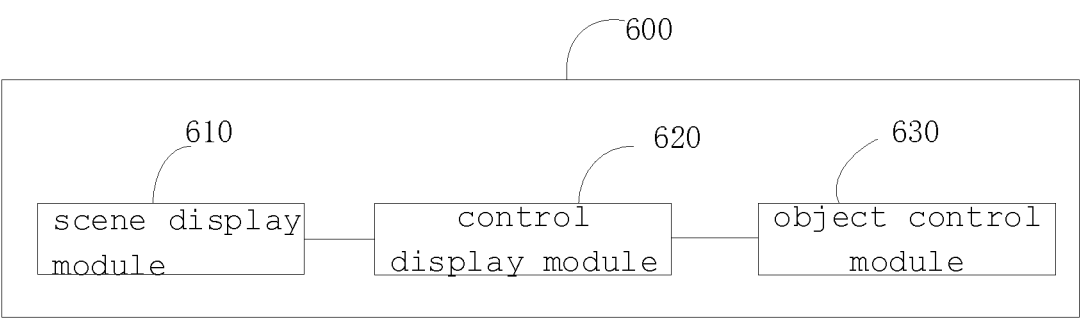
FIG. 6 is a schematic structural diagram of a control apparatus of a virtual object according to embodiments of the present disclosure.

FIG. 6 is a schematic structural diagram of a control apparatus of a virtual object according to embodiments of the present disclosure. The control apparatus of a virtual object according to the embodiments of the present disclosure may execute the processing flow according to the embodiment of the control method of a virtual object, and as shown in FIG. 6, the control apparatus 600 of a virtual object comprises: a scene display module 610, a control display module 620, and an object control module 630.

The scene display module 610 may be configured to display a target virtual scene in a target interactive interface, the target virtual scene comprising a plurality of virtual objects and a virtual subject controlled by a user;

The control display module 620 may be configured to, under the condition that there is a target virtual object in the plurality of virtual objects, display a target control, the target virtual object being a virtual object controllable by the virtual subject in a non-contact manner;

The object control module 630 may be configured to, in response to receiving a trigger operation on the target control, cause the virtual subject to perform non-contact control on the target virtual object according to a control mode corresponding to the target control.

The embodiment of the present disclosure can automatically identify the target virtual object controllable by the virtual subject in a non-contact manner, in the target virtual scene displayed in the target interactive interface, and display the target control to prompt a user to control the target virtual object, then after receiving a trigger operation on the target control, in response to the trigger operation, cause the virtual subject to control the target virtual object in a non-contact manner according to the control mode corresponding to the target control, so that the player can operate the automatically selected virtual object from a distance, thereby increasing sense of science and technology and sense of fantasy to the game, and increasing funs to the player.

In the embodiments of the present disclosure, the control apparatus 600 of a virtual object comprises: an entirety highlighting module, a brightness reducing module and an edge highlighting module.

The entirety highlighting module may be configured to highlight the target virtual object in its entirety under the condition that there is the target virtual object in the plurality of virtual objects.

The brightness reducing module may be configured to reduce a brightness value of the target virtual object in real time according to a preset brightness difference.

The edge highlighting module may be configured to highlight an edge of the target virtual object when the brightness value of the target virtual object is reduced to a preset brightness value.

In the embodiment of the present disclosure, the control apparatus 600 of a virtual object further comprises: a control cancelling module.

The control cancelling module may be configured to cancel displaying the target control under the condition that the brightness value of the target virtual object is reduced to the preset brightness value.

In the embodiments of the present disclosure, the target control comprises a follow control.

The object control module 630 may further comprise: a height determining unit, a height control unit, a distance calculating unit and a distance control unit.

The height determining unit may be configured to determine a preset ground clearance corresponding to the target virtual object.

The height control unit may be configured to control the target virtual object to move to the preset ground clearance in a vertical direction.

The distance calculating unit may be configured to calculate a first horizontal distance between the target virtual object and the virtual subject.

The distance control unit may be configured to control to keep the first horizontal distance between the target virtual object and the virtual subject.

In the embodiments of the present disclosure, the target control comprises a hit control.

The object control module 630 may further comprise: a distance determining unit, a path determining unit, and an object hitting unit.

The distance determining unit may be configured to determine a hit distance between the target virtual object and a hitting target.

The path determining unit may be configured to determine a hit path corresponding to the target virtual object according to the hit distance and a preset path type corresponding to the target virtual object.

The object hitting unit may be configured to control the target virtual object to hit the hitting target according to the hit path.

In the embodiments of the present disclosure, the object hitting unit is configured to control the target virtual object to hit the hitting target according to the hit path, thereafter, the control apparatus 600 of a virtual object further comprises: a type determining module, a result displaying module, a damage timing module and a redisplaying module.

The type determining module may be configured to determine a type of a hit result corresponding to the target virtual object.

The result displaying module may be configured to display the hit result corresponding to the target virtual object based on the type of the hit result.

The damage timing module may be configured to time a damage duration of the target virtual object if the type of the hit result is a damage type.

The redisplaying module may be configured to redisplay the target virtual object in the target virtual scene if the damage duration reaches a preset duration.

In the embodiments of the present disclosure, the control apparatus 600 of a virtual object further comprises an attribute obtaining module and a number determining module.

The attribute obtaining module may be configured to obtain a subject attribute of the virtual subject, the subject attribute comprising at least one of a subject level or a target skill rank.

The number determining module may be configured to determine a maximum number of objects that can be controlled by the virtual subject in a non-contact control manner, based on the subject property.

The number of target virtual objects is less than or equal to the maximum number of objects.

In the embodiments of the present disclosure, the control apparatus 600 of the virtual object further comprises a parameter obtaining module, a control object selecting module, and a target object selecting module.

The parameter obtaining module may be configured to obtain object parameters of the virtual objects, the object parameters including object attributes and object priorities.

The control object selecting module may be configured to select an operable object among the plurality of virtual objects based on the object properties.

The target object selecting module may be configured to select a target virtual object among the operable objects according to the object priorities.

In the embodiments of the present disclosure, the object parameters further include object importance.

The target object selecting module may be further configured to select a target virtual object from the operable objects with the highest object priority according to the object importance.

In the embodiments of the present disclosure, the object parameters further include an object interaction state.

The target object selecting module is configured to select a target virtual object from the operable objects according to the object priorities, thereafter, the control apparatus 600 of a virtual object further comprises an object eliminating module.

The object eliminating module may be configured to eliminate the target virtual object whose object interaction state is non-interactable.

In the embodiments of the present disclosure, the object parameters further include a second horizontal distance from a center of the target interactive interface.

The target object selecting module is configured to select a target virtual object among the operable objects according to the object priorities, thereafter, the control apparatus 600 of a virtual object further comprises an object screening module.

The object screening module may be configured to reserve the target virtual object whose second horizontal distance meets a preset distance screening condition.

It should be noted that, the control apparatus 600 of a virtual object shown in FIG. 6 may perform each step in the method embodiments shown in FIG. 1 to FIG. 5, and implement each process and effect in the method embodiments shown in FIG. 1 to FIG. 5, which are not described herein again.

The embodiments of the present disclosure also provide an electronic device that may comprise a processor and a memory configured to store executable instructions. The processor may be configured to read the executable instructions from the memory and execute the executable instructions to implement the control method of a virtual object in the foregoing embodiments.

Figure 7:
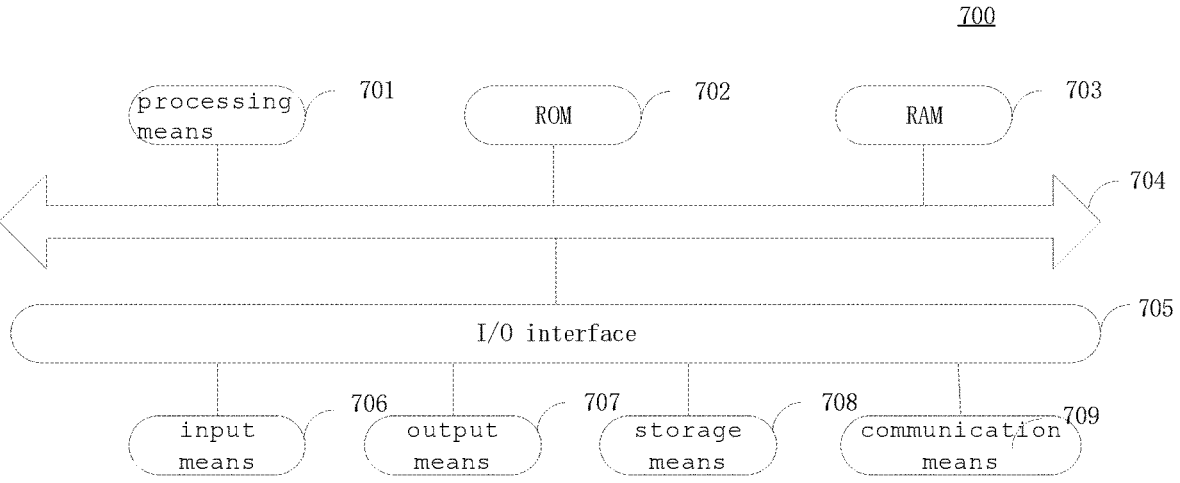
FIG. 7 is a schematic structural diagram of an electronic device according to embodiments of the present disclosure.

FIG. 7 shows a schematic structural diagram of an electronic device according to an embodiment of the present disclosure. Referring now specifically to FIG. 7, a schematic structural diagram of an electronic device 700 suitable for use in implementing the embodiments of the present disclosure is shown.

The electronic device may include, but is not limited to, a mobile terminal such as a VR (virtual reality), mobile phone, notebook computer, digital broadcast receiver, PDA (personal digital assistant), PAD (tablet computer), PMP (portable multimedia player), in-vehicle terminal (e.g., in-vehicle navigation terminal), wearable device and so on and a fixed terminal such as a digital TV, desktop computer, smart home device and so on.

It should be noted that the electronic device 700 shown in FIG. 7 is only an example, and should not bring any limitation to the functions and the application scopes of the embodiments of the present disclosure.

As shown in FIG. 7, the electronic device 700 may include a processing means (e.g., a central processor, a graphics processor, etc.) 701 that may perform various appropriate actions and processes according to a program stored in a Read Only Memory (ROM) 702 or a program loaded from a storage means 708 into a Random Access Memory (RAM) 703. In the RAM 703, various programs and data necessary for the operation of the electronic device 700 are also stored. The processing means 701, the ROM 702, and the RAM 703 are connected to each other via a bus 704. An input/output (I/O) interface 705 is also connected to the bus 704.

Generally, the following means may be connected to the I/O interface 705: input means 706 including, for example, a touch screen, touch pad, keyboard, mouse, camera, microphone, accelerometer, gyroscope, or the like; output means 707 including, for example, a Liquid Crystal Display (LCD), a speaker, a vibrator, or the like; the storage means 708, including, for example, a magnetic tape, hard disk, or the like; and communication means 709. The communication means 709 may allow the electronic device 700 to communicate with other devices in a wireless or wired manner, to exchange data. While FIG. 7 illustrates the electronic device 700 having various means, it is to be understood that not all illustrated means are required to be implemented or provided. More or fewer means may be alternatively implemented or provided.

The embodiments of the present disclosure also provide a non-transitory computer readable storage medium storing a computer program that, when executed by a processor, causes the processor to implement the control method of a virtual object in the above-described embodiments.

In particular, the processes described above with reference to the flowcharts may be implemented as a computer software program, according to the embodiments of the present disclosure. For example, the embodiments of the present disclosure comprise a computer program product that comprises a computer program carried on a non-transitory computer readable medium, the computer program containing program code for performing the method illustrated by the flowchart. In such an embodiment, the computer program may be downloaded from a network via the communication means 709 and installed, or may be installed from the storage means 708, or may be installed from the ROM 702. When the computer program is executed by the processing means 701, the above-described functions defined in the control method of a virtual object according to the embodiment of the present disclosure are executed.

It should be noted that the above non-transitory computer-readable medium of the present disclosure may be a non-transitory computer-readable signal medium or a non-transitory computer readable storage medium or any combination of the two. The non-transitory computer readable storage medium may be, for example, but not limited to, an electronic, magnetic, optical, electromagnetic, infrared, or semiconductor system, apparatus, or device, or any combination of the above. More specific examples of the non-transitory computer readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the non-transitory computer readable storage medium may be any tangible medium containing or storing a program which can be used by or in conjunction with an instruction execution system, apparatus, or device. However, in the present disclosure, the non-transitory computer-readable signal medium may include a data signal propagated in baseband or as part of a carrier wave, in which computer-readable program code is carried. Such a propagated data signal may take a variety of forms, including, but not limited to, electromagnetic signals, optical signals, or any suitable combination of the above. The non-transitory computer-readable signal medium may also be any non-transitory computer-readable medium other than the non-transitory computer readable storage medium, which can send, propagate, or transmit a program for use by or in conjunction with an instruction execution system, apparatus, or device. The program code contained on the non-transitory computer-readable medium may be transmitted using any appropriate medium, including but not limited to: wires, optical cables, RF (radio frequency), etc., or any suitable combination of the above.

In some implementations, a client and a server may communicate using any currently known or future developed network protocol, such as HTTP (HyperText Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above non-transitory computer-readable medium may be contained in the above electronic device; or may exist separately without being assembled into the electronic device.

The above non-transitory computer-readable medium has thereon carried one or more programs which, when executed by the electronic device, cause the electronic device to:

display a target virtual scene in a target interactive interface, the target virtual scene comprising a plurality of virtual objects and a virtual subject controlled by a user; under the condition that there is a target virtual object in the plurality of virtual objects, display a target control, the target virtual object being a virtual object controllable by the virtual subject in a non-contact manner; in response to receiving a trigger operation on the target control, cause the virtual subject to perform non-contact control on the target virtual object according to a control mode corresponding to the target control.

In the embodiments of the present disclosure, computer program code for performing operations of the present disclosure may be written in one or more programming languages or a combination thereof. The above programming language includes, but is not limited to, an object-oriented programming language such as Java, Smalltalk, and C++, and further includes a conventional procedural programming language such as the "C" language or a similar programming language. The program code may be executed entirely on a user's computer, partly on the user's computer, as a stand-alone software package, partly on the user's computer and partly on a remote computer, or entirely on the remote computer or server. In a scenario where the remote computer is involved, the remote computer may be connected to the user's computer through any type of network, including a local area network (LAN) or a wide area network (WAN), or connected to an external computer (for example, through the Internet using an Internet service provider).

The flowcharts and block diagrams in the drawings illustrate the possibly implemented architecture, functions, and operations of the systems, methods and computer program products according to various embodiments of the present disclosure. In this regard, each block in the flowchart or block diagram may represent one module, program segment, or part of code, which contains one or more executable instructions for implementing specified logical functions. It should also be noted that, in some alternative implementations, the functions noted in the blocks may also occur in a different order from those noted in the drawings. For example, two blocks shown in succession may, in fact, be executed substantially concurrently, and they may sometimes be executed in a reverse order, which depends upon functions involved. It will also be noted that each block of the block diagrams and/or flowcharts, and a combination of blocks in the block diagrams and/or flowcharts, can be implemented by a special-purpose hardware-based system that performs the specified functions or operations, or by a combination of special-purpose hardware and computer instructions.

The involved modules described in the embodiment of the present disclosure may be implemented by software or hardware. The name of the module, in some cases, does not constitute a limitation on the module itself.

The functions described above herein may be at least partially executed by one or more hardware logic components. For example, without limitation, an exemplary type of hardware logic components that may be used includes: a field programmable gate array (FPGA), application specific integrated circuit (ASIC), application specific standard product (ASSP), system on chip (SOC), complex programmable logic device (CPLD), and the like.

In the context of this disclosure, a non-transitory machine-readable medium may be a tangible medium, which may contain or store a program for use by or in conjunction with an instruction execution system, apparatus, or device. The non-transitory machine-readable medium may be anon-transitory machine-readable signal medium or anon-transitory machine-readable storage medium. The non-transitory machine-readable medium may include, but is not limited to, an electronic, magnetic, optical, electromagnetic, infrared, or semiconductor system, apparatus, or device, or any suitable combination of the above. More specific examples of the non-transitory machine-readable storage medium may include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

The foregoing description is only the preferred embodiments of the present disclosure and an explanation of the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts. For example, a technical solution formed by performing mutual replacement between the above features and technical features having similar functions to those disclosed (but not limited to) in the present disclosure.

Further, while operations are depicted in a particular order, this should not be understood as requiring that such operations be performed in the particular order shown or in sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological actions, it is to be understood that the subject matter defined in the appended claims is not necessarily limited to the specific features or actions described above. Rather, the specific features and actions described above are merely example forms of implementing the claims.

What is claimed is:

1. A control method of a virtual object, comprising:
displaying a target virtual scene in a target interactive interface, the target virtual scene comprising a plurality of virtual objects and a virtual subject controlled by a user;
under the condition that there is a target virtual object in the plurality of virtual objects, displaying a target control, the target virtual object being a virtual object controllable by the virtual subject in a non-contact manner;
in response to receiving a trigger operation on the target control, causing the virtual subject to perform non-contact control on the target virtual object according to a control mode corresponding to the target control,
wherein the target control comprises a follow control,
wherein, the causing the virtual subject to perform non-contact control on the target virtual object according to a control mode corresponding to the target control, comprises:
determining a preset ground clearance corresponding to the target virtual object;
controlling the target virtual object to move to the preset ground clearance in a vertical direction;
calculating a first horizontal distance between the target virtual object and the virtual subject; and
controlling to keep the first horizontal distance between the target virtual object and the virtual subject.

2. The method according to claim 1, wherein the method further comprises:
under the condition that there is the target virtual object in the plurality of virtual objects, highlighting the target virtual object in its entirety;
reducing a brightness value of the target virtual object in real time according to a preset brightness difference; and
under the condition that the brightness value of the target virtual object is reduced to a preset brightness value, highlighting an edge of the target virtual object.

3. The method according to claim 1, wherein the method further comprises:
under the condition that there is the target virtual object in the plurality of virtual objects, highlighting the target virtual object in its entirety;
reducing a brightness value of the target virtual object in real time according to a preset brightness difference; and under the condition that the brightness value of the target virtual object is reduced to a preset brightness value, cancelling displaying the target virtual object.

4. The method according to claim 1, wherein the target control further comprises a hit control;
wherein, the causing the virtual subject to perform non-contact control on the target virtual object according to a control mode corresponding to the target control, comprises:
determining a hit distance between the target virtual object and a hitting target;
determining a hit path corresponding to the target virtual object according to the hit distance and a preset path type corresponding to the target virtual object; and
controlling the target virtual object to hit the hitting target according to the hit path.

5. The method according to claim 4, wherein, after the controlling the target virtual object to hit the hitting target according to the hit path, the method further comprises:
determining a type of a hit result corresponding to the target virtual object;
displaying the hit result corresponding to the target virtual object based on the type of the hit result;
if the type of the hit result is a damage type, timing a damage duration of the target virtual object; and
if the damage duration reaches a preset duration, redisplaying the target virtual object in the target virtual scene.

6. The method according to claim 1, wherein the method further comprises:
obtaining a subject attribute of the virtual subject, wherein the subject attribute comprises at least one of a subject level or a target skill rank; and
determining a maximum number of objects that can be controlled by the virtual subject in a non-contact manner according to the subject attribute;
wherein the number of target virtual objects is less than or equal to the maximum number of objects.

7. The method according to claim 1, wherein the method further comprises:
obtaining object parameters of the virtual objects, the object parameters comprising object attributes and object priorities;
selecting an operable object among the plurality of virtual objects based on the object attributes; and
selecting the target virtual object among the operable objects according to the object priorities.

8. The method according to claim 7, wherein the object parameters further include object importance;
wherein the selecting the target virtual object among the operable objects according to the object priorities comprises:
selecting the target virtual object among the operable objects with the highest object priority according to the object importance.

9. The method of claim 7, wherein the object parameters further include an object interaction state;
wherein after the selecting the target virtual object among the operable objects according to the object priorities, the method further comprises:
eliminating the target virtual object whose object interaction state is non-interactable.

10. The method according to claim 7, wherein the object parameters further comprise a second horizontal distance from a center of the target interactive interface;

wherein after the selecting the target virtual object among the operable objects according to the object priorities, the method further comprises:

reserving the target virtual object whose second horizontal distance meets a preset distance screening condition.

11. An electronic device, comprising:

a processor;

a memory configured to store executable instructions;

wherein the processor is configured to read the executable instructions from the memory and execute the executable instructions to implement a control method of a virtual object, wherein the method comprises:

displaying a target virtual scene in a target interactive interface, the target virtual scene comprising a plurality of virtual objects and a virtual subject controlled by a user;

under the condition that there is a target virtual object in the plurality of virtual objects, displaying a target control, the target virtual object being a virtual object controllable by the virtual subject in a non-contact manner;

in response to receiving a trigger operation on the target control, causing the virtual subject to perform non-contact control on the target virtual object according to a control mode corresponding to the target control, wherein the target control comprises a follow control, wherein, the causing the virtual subject to perform non-contact control on the target virtual object according to a control mode corresponding to the target control, comprises:

determining a preset ground clearance corresponding to the target virtual object;

controlling the target virtual object to move to the preset ground clearance in a vertical direction;

calculating a first horizontal distance between the target virtual object and the virtual subject; and controlling to keep the first horizontal distance between the target virtual object and the virtual subject.

12. The electronic device according to claim 11, wherein the processor is configured to read the executable instructions from the memory and execute the instructions to further implement steps of:

under the condition that there is the target virtual object in the plurality of virtual objects, highlighting the target virtual object in its entirety;

reducing a brightness value of the target virtual object in real time according to a preset brightness difference; and under the condition that the brightness value of the target virtual object is reduced to a preset brightness value, highlighting an edge of the target virtual object.

13. The electronic device according to claim 11, wherein the processor is configured to read the executable instructions from the memory and execute the instructions to further implement steps of:

under the condition that there is the target virtual object in the plurality of virtual objects, highlighting the target virtual object in its entirety;

reducing a brightness value of the target virtual object in real time according to a preset brightness difference; and under the condition that the brightness value of the target virtual object is reduced to a preset brightness value, cancelling displaying the target virtual object.

14. The electronic device according to claim 11, wherein the target control comprises a hit control;

wherein, the causing the virtual subject to perform non-contact control on the target virtual object according to a control mode corresponding to the target control, comprises:

determining a hit distance between the target virtual object and a hitting target;

determining a hit path corresponding to the target virtual object according to the hit distance and a preset path type corresponding to the target virtual object; and controlling the target virtual object to hit the hitting target according to the hit path.

15. A non-transitory computer readable storage medium, wherein the storage medium stores a computer program which, when executed by a processor, causes the processor to implement the control method of a virtual object according to claim 1.

16. A non-transitory computer readable storage medium, wherein the storage medium stores a computer program which, when executed by a processor, causes the processor to implement the control method of a virtual object according to claim 2.

17. A non-transitory computer readable storage medium, wherein the storage medium stores a computer program which, when executed by a processor, causes the processor to implement the control method of a virtual object according to claim 3.

* * * * *